United States Patent
Liang et al.

(10) Patent No.: US 8,811,317 B2
(45) Date of Patent: Aug. 19, 2014

(54) METHOD FOR IMPLEMENTING LOCAL ACCESS AND SYSTEM THEREOF

(75) Inventors: Shuang Liang, Shenzhen (CN); Na Zhou, Shenzhen (CN); Yuzhen Huo, Shenzhen (CN); Jing Wang, Shenzhen (CN); Zaifeng Zong, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 118 days.

(21) Appl. No.: 13/258,294

(22) PCT Filed: Oct. 28, 2010

(86) PCT No.: PCT/CN2010/078204
§ 371 (c)(1),
(2), (4) Date: Apr. 27, 2012

(87) PCT Pub. No.: WO2011/050737
PCT Pub. Date: May 5, 2011

(65) Prior Publication Data
US 2012/0207104 A1    Aug. 16, 2012

(30) Foreign Application Priority Data

Oct. 30, 2009   (CN) .......................... 2009 1 0236994

(51) Int. Cl.
| | | |
|---|---|---|
| *H04W 4/00* | (2009.01) | |
| *H04W 48/20* | (2009.01) | |
| *H04W 8/08* | (2009.01) | |
| H04W 84/04 | (2009.01) | |
| H04L 29/12 | (2006.01) | |

(52) U.S. Cl.
CPC ............ *H04W 48/20* (2013.01); *H04W 84/045* (2013.01); *H04L 61/1511* (2013.01); *H04L 61/3075* (2013.01); *H04L 61/303* (2013.01); *H04W 8/082* (2013.01)
USPC ........... 370/329; 370/216; 370/310; 370/338; 370/389; 455/412.1; 455/435.1; 455/445

(58) Field of Classification Search
USPC ......... 370/216, 310, 328–338, 352, 389, 401; 455/412.1, 435.1, 445
See application file for complete search history.

(56) References Cited

U.S. PATENT DOCUMENTS 6,839,421 B2 *   1/2005   Ferraro Esparza et al. ........................ 379/220.01
7,936,734 B2 *   5/2011   Toledano et al. ............. 370/338
(Continued)

FOREIGN PATENT DOCUMENTS

CN   101291283 A   10/2008
CN   101483585 A    7/2009
(Continued)

OTHER PUBLICATIONS

Supplementary European Search Report in European application No. 10826100.9, mailed on Jun. 25, 2013.

(Continued)

*Primary Examiner* — Andrew Lai
*Assistant Examiner* — Andrew C Lee
(74) *Attorney, Agent, or Firm* — Oppedahl Patent Law Firm LLC (57) ABSTRACT

The disclosure discloses a method for implementing local access, which includes: after user terminal initiates a local access and a mobile management unit determines that the local connection can be established for the user terminal, the mobile management unit acquires local access gateway information through a Domain Name System (DNS) server. The disclosure further discloses a system for implementing local access, correspondingly. By providing a specific implementation solution of inquiring the local access gateway, the disclosure ensures selection between the core network gateway and the local access gateway according to a respective scenario, thus properly and effectively implementing the local access function implemented by the user terminal through the local access gateway.

8 Claims, 6 Drawing Sheets

(56) References Cited

U.S. PATENT DOCUMENTS

| | | | |
|---|---|---|---|
| 8,064,907 B2* | 11/2011 | Gallagher et al. | 455/435.1 |
| 8,311,012 B2* | 11/2012 | Nishida et al. | 370/331 |
| 8,406,170 B2* | 3/2013 | Rune | 370/328 |
| 8,537,748 B2* | 9/2013 | Witzel et al. | 370/328 |
| 2008/0254768 A1* | 10/2008 | Faccin | 455/411 |
| 2009/0073933 A1* | 3/2009 | Madour et al. | 370/331 |
| 2009/0109986 A1* | 4/2009 | Zhao et al. | 370/401 |
| 2009/0305707 A1* | 12/2009 | Pudney | 455/445 |
| 2009/0318147 A1* | 12/2009 | Zhang et al. | 455/435.1 |
| 2010/0040024 A1* | 2/2010 | Wu | 370/331 |
| 2010/0054222 A1* | 3/2010 | Rune | 370/338 |

FOREIGN PATENT DOCUMENTS

| | | |
|---|---|---|
| CN | 101534496 A | 9/2009 |
| CN | 101547142 A | 9/2009 |
| CN | 101568149 A | 10/2009 |

OTHER PUBLICATIONS

Architecture alternative for local IP access Mar. 24, 2009.
Key aspects: P-GW/GGSN location principles for LIPA and SIPTO traffic Aug. 28, 2009.
3rd Generation Partnership Project; Technical Specification Group Core Network and Terminals; Domain Name System Procedures; Stage 3 (Release 8) Sep. 1, 2009.
International Search Report in international application No. PCT/CN2010/078204, mailed on Jan. 27, 2011.
English Translation of the Written Opinion of the International Search Authority in international application No. PCT/CN2010/078204, mailed on Jan. 27, 2011.

* cited by examiner

METHOD FOR IMPLEMENTING LOCAL ACCESS AND SYSTEM THEREOF

TECHNICAL FIELD

The disclosure relates to local access technology and in particular to a method for implementing local access and a system thereof.

BACKGROUND

Figure 1:
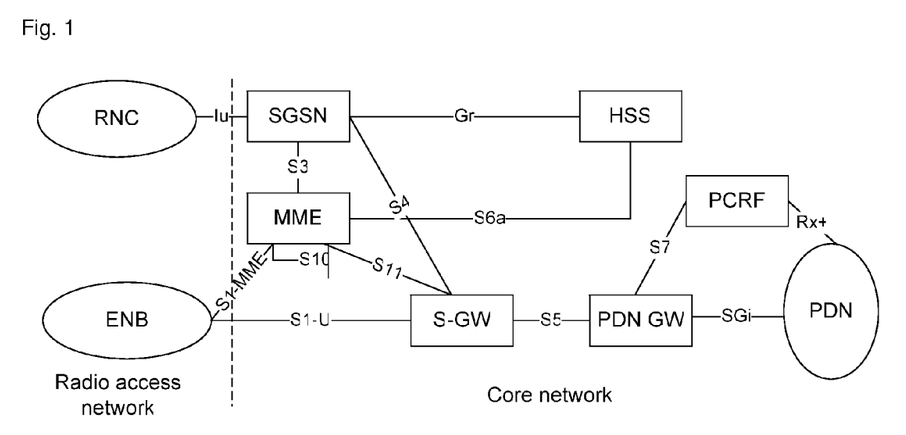
FIG. 1 shows a constitutional schematic view of the existing EPS system.

In order to keep the competitiveness of the third generation mobile communication system in the communication field, to provide users with more personalized mobile communication services with faster speed and lower time delay, and also to reduce operating costs of operators, the third Generation Partnership Project (3GPP) standard team is focusing on research of the Evolved Packet System (EPS). FIG. 1 shows a constitutional schematic view of the existing EPS. As shown in FIG. 1, the whole EPS is divided into two parts: the radio access network and the core network.

The core network includes a Home Subscriber Server (HSS), a Mobility Management Entity (MME), a Serving General Packet Radio Service (GPRS) Support Node (SGSN), a Policy And Charging Rule Function (PCRF), a Serving Gateway (S-GW), a PDN Gateway (P-GW) and a Packet Data Network (PDN).

Specifically, the HSS is the permanent storage site of subscription data of the user, located in the home network to which the user subscribes;

the MME is the storage site of subscription data of the user in the current network, and is responsible for terminal-to-network non-access stratum signalling management, security verification function of terminal, mobility management of terminal, tracking and paging management function in a user idle mode and bearing management;

the SGSN is the service support point for accessing the core network by GERAN and UTRAN users, of which the functions are similar to those of the mobility management entity, and is responsible for location update of the user, paging management and bearing management and so on;

the S-GW is the gateway between the core network and the radio system, and is responsible for terminal-to-core-network user plane bearing, data caching in a terminal idle mode, function of initiating service request at the network side, legal monitoring and packet data routing and forwarding function; the serving gateway is responsible for gathering conditions of using the wireless network by the user terminal, generating a bill of using the wireless network by the terminal, and transferring it to the charging gateway;

the P-GW is a gateway between the evolution system and the packet data network outside the evolution system; the P-GW is connected to the Internet and the packet data network, and is responsible for Internet protocol (IP) address assignment, charging function, packet filtering and policy control and other functions of the terminal;

the PDN is an IP service network of the operator, which provides IP services to users through the core network of the operator;

the PCRF is a server in the evolution system, which is responsible for providing rules for charging control, online credit control, threshold control, quality of service (QoS) policy.

The radio access network consists of an E-UTRAN NodeB (eNB) and 3G Radio Network Controller (RNC). The radio access network is mainly responsible for receiving and transmitting radio signals, communicating with the terminal through air interfaces, managing radio resources of the air interfaces, resource scheduling and access control.

The Serving GPRS Support Node is an upgraded SGSN, which can support a S4 interface with the serving gateway and communicate with the MME using GTPv2 protocol. For a SGSN supporting the 3G core network, the PS domain network architecture might be different from that shown in FIG. 1. At this time, the SGSN and the MME are connected through a Gn interface while communicate with each other using the GTPv1 protocol. The SGSN is unable to be connected to the serving gateway and connected to the Gateway GPRS Support Node (GGSN) through the Gn interface to directly access the packet data network.

The Home NodeB (HNB) or Home eNodeB (HeNB) is a small base station of low power. As private resources for some users, they are arranged to be used in private places such as home, organizations, companies or schools, and mainly used for providing higher service rate to users and reducing costs required for high-rate services, and also used for making up the insufficiencies in terms of coverage of the existing distributed cellular radio communication system. The Home (e)NodeB has the advantages of economy, convenience, low-power output, plug-and-play, wideband access and use of single-mode terminal and so on.

Figure 2:
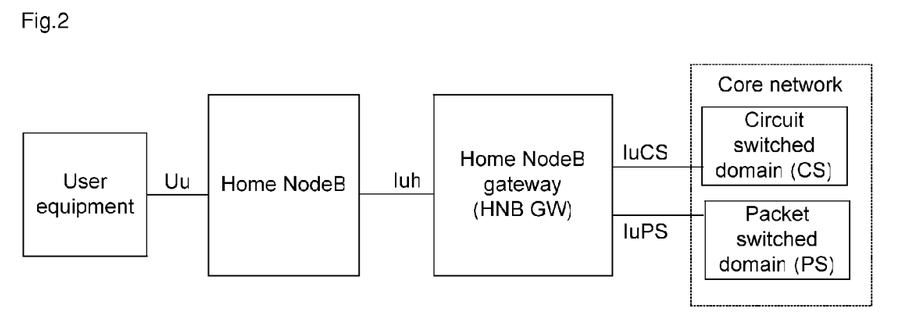
FIG. 2 shows a schematic view of the architecture of the existing 3G Home NodeB network.
Figure 3:
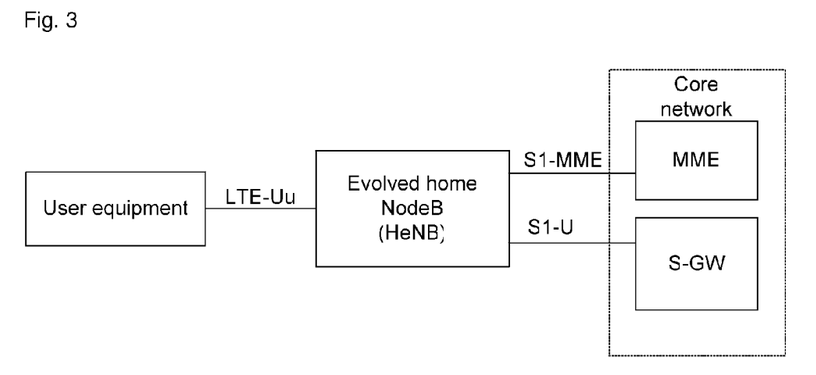
FIG. 3 shows a schematic view of the first architecture of the existing LTE Home NodeB network.
Figure 4:
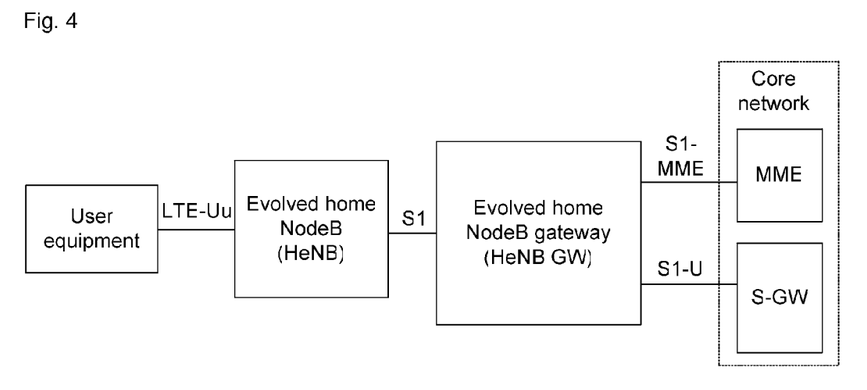
FIG. 4 shows a schematic view of the second architecture of the existing LTE Home NodeB network.
Figure 5:
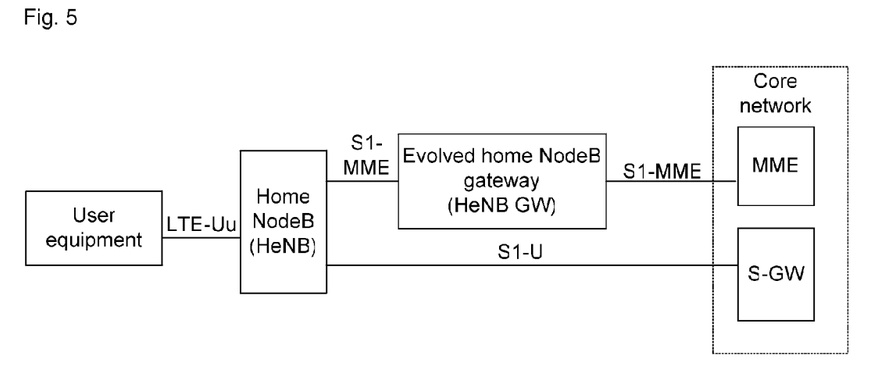
FIG. 5 shows a schematic view of the third architecture of the existing LTE Home NodeB network.

The Home (e)NodeB can be applied in the 3G or Long-Term Evolution (LTE) mobile communication network. In order to manage the Home (e)NodeB conveniently, a new network element, that is, Home (e)NodeB gateway, is introduced in the network. The Home (e)NodeB gateway mainly has the functions of: verifying the security of the Home (e)NodeB, maintaining and managing the operation of the Home (e)NodeB, configuring and controlling the Home (e)NodeB according to requirements of operators, being responsible for exchanging data information between the core network and the Home (e)NodeB. FIG. 2 shows a schematic view of the architecture of the existing 3G Home NodeB network, as shown in FIG. 2, the 3G Home NodeB is connected to the Home NodeB gateway through a newly defined Iuh interface, and the Home NodeB gateway provides IuPS and IuCs interfaces to packet domain and circuit domain of the core network respectively. For the 3G network, the Home NodeB gateway is an essential device for shielding the terminal and the network side from the influence of the introduced Home NodeB. For the LTE network, the Home eNodeB gateway is an optional device. Therefore, the LTE Home eNodeB and the core network can be connected in the following two ways: first, the Home eNodeB is directly connected to the network elements of the core network, as shown in FIG. 3. FIG. 3 shows the schematic view of the first architecture of the existing LTE Home eNodeB network; and second, the Home eNodeB is connected to the network elements of the core network through a gateway, as shown in FIG. 4. FIG. 4 shows a schematic view of the second architecture of the existing LTE Home eNodeB network. In a scenario in which the Home eNodeB gateway is introduced as shown in FIG. 4, the Home eNodeB gateway may not be integrated with user plane functions, and a user plane is directly established between the Home eNodeB and the user plane gateway of the core network, such that the user plane can be flattened and data transmission latency can be decreased, as shown in FIG. 5. FIG. 5 shows the schematic view of the third architecture of the existing LTE Home eNodeB network.

Figure 6:
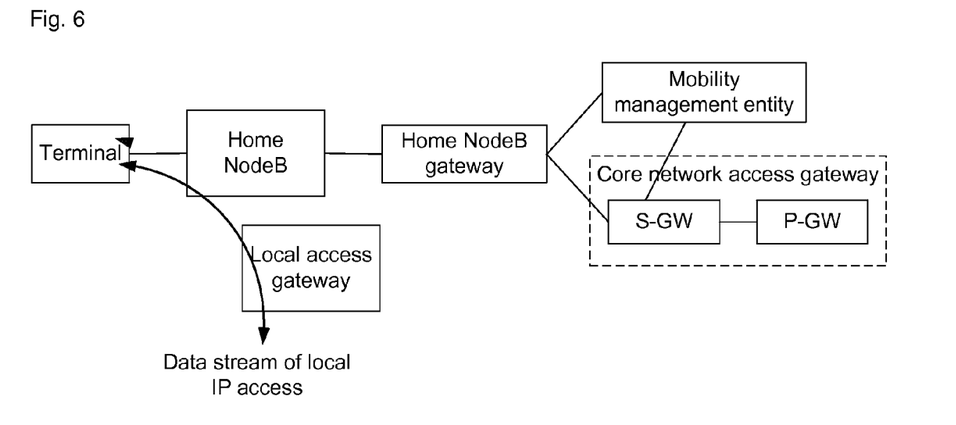
FIG. 6 shows a schematic view of the first architecture of the existing network for implementing local access.
Figure 7:
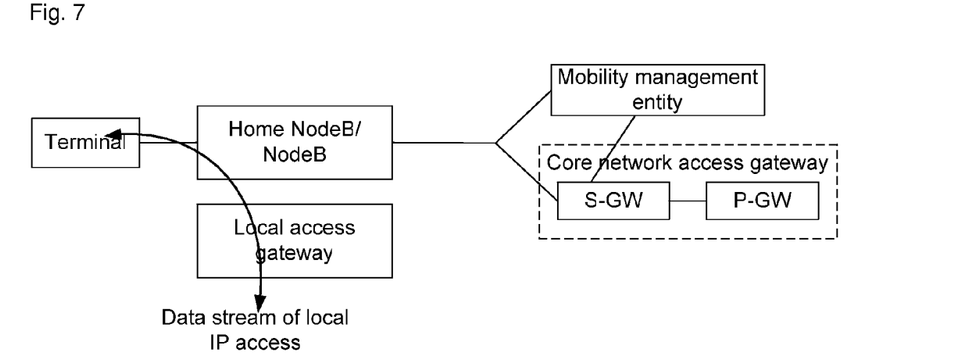
FIG. 7 shows a schematic view of the second architecture of the existing network for implementing local access.

The Home (e)NodeB supports not only access through the mobile core network, but also local IP access. Under the condition that the Home (e)NodeB has the local IP access capacity and the subscription permits the local IP access of the user, the user can perform local access to other IP devices in the home network or to the Internet. Through the local access function, the Internet data traffic can be shunt to decrease load of the core network, and access to the home network devices may be performed without forwarding by means of the core network, such that the data transmission is convenient and effective. Local IP access function also can be used in macro cells, in which the main functions are similar to those in the Home (e)NodeB. What is applied more frequently is the scenario of local IP access to the Internet, with the purpose of reducing the load of the core network. FIG. 6 shows the schematic view of the first architecture of the existing network for implementing local access, and FIG. 7 shows the schematic view of the second architecture of the existing network for implementing local access. As shown in FIG. 6 and FIG. 7, the main difference is whether there is a Home (e)NodeB gateway. The local access gateway is associated with a network which is locally accessed to the external network (for example, Internet), which provides address assignment, charging, packet filtering, policy control and other functions. When in an actual arrangement, the local access gateway, as a logic unit module, can be arranged together with the existing Home (e)NodeB or the base station. For a local access architecture implemented in a macro cell, the radio access gateway can be arranged together with the base station, which is implemented by the architecture as shown in FIG. 7.

In order to avoid introducing a new network element to make the network too complex, the above function can be implemented by reconstructing the existing core network gateway, that is, the GGSN or SGW/PGW is reconstructed to serve as a local access gateway, for example, by reducing unnecessary functions, or reducing admission capacity or processing capability of the local access gateway (in consideration that the number of users and data amount for a local connection are highly smaller than those for the core network gateway, respectively). The local access gateway acquired by reconstruction has the same functions as the core network.

When the MME establishes a PDN connectivity for the terminal, it decides whether a core network gateway or a local access gateway is selected according to a respective scenario. Currently, there is no implementation in which a local access gateway may be inquired. Therefore, it is impossible to select a core network gateway or a local access gateway according to a respective scenario. Thus, it is impossible to select a local access gateway properly and effectively to implement the local access function.

SUMMARY

In this case, the main purpose of the disclosure is to provide a method for implementing local access, which can select a local access gateway properly and effectively to implement the local access function.

Another purpose of the disclosure is to provide a system for implementing local access, which can select a local access gateway properly and effectively to implement the local access function.

In order to achieve the above purposes, the technical solution of the disclosure is implemented as follows:

A method for implementing local access includes:
when a local connection is to be established,
constructing a domain name and inquiring local access gateway information from a Domain Name System (DNS) server, by the mobile management unit, according to a used Access Point Name (APN) and at least one of a base station identity, a local access identifier, a Closed Subscriber Group (CSG), a location identifier, and a tracking area/routing area identity;
returning, by the DNS server, the local access gateway information to the mobile management unit; and
selecting, by the mobile management unit, one local access gateway based on the gateway information, to establish the local connection.

The constructing the domain name and inquiring the local access gateway information from the DNS server by the mobile management unit may include the following steps performed by the mobile management unit:
constructing a Fully Qualified Domain Name (FQDN) according to the APN and at least one of the base station identity, the local access identifier, the CSG identifier, the location identifier, and the tracking area/routing area identity; and using the constructed FQDN as an input parameter for DNS inquiry, such that the DNS server returns the local access gateway based on a constructional request to the mobile management unit; or,
constructing the FQDN according to the APN; and indicating in a flag that at least one of the base station identity, the local access identifier, the CSG identifier, location information, and the tracking area/routing area identity is to be selected, such that the DNS server returns the local access gateway based on a request to the mobile management unit.

Establishing the local connection may include:
determining, by the mobile management unit, that the local connection can be established for a user terminal, on condition that a base station to which the user terminal initiates local access has a local access capability and a subscription permits the local access of the user terminal.

The local access may include a local access initiated during an attach procedure, or a Packet Data Network (PDN) connectivity establishment procedure, or a Packet Data Protocol (PDP) context activation procedure.

When the user terminal initiates the local access in an attach request, the method for implementing local access may be applicable to LTE access or UTRAN/GERAN access;
for the LTE access, the base station to which the user terminal initiates the local access may be an evolved Home NodeB (HeNB) or an evolved NodeB (eNB), and the mobile management unit may be a Mobility Management Entity (MME);
for the UTRAN/GERAN access, the base station to which the user terminal initiates the local access may be a Home NodeB (HNB) or a Radio Network Controller (RNC), and the mobile management unit may be a Serving GPRS Support Node (SGSN);
when the user terminal initiates the local access during the PDN connectivity establishment procedure, the method for implementing local access may be applicable to LTE access, the base station to which the user terminal initiates the local access may be an HeNB or an eNB, and the mobile management unit may be an MME;
when the user terminal initiates the local access during the PDP context activation procedure, the method for implementing local access may be applicable to UTRAN/GERAN access, the base station to which the user terminal initiates the local access may be an HNB or an RNC, and the mobile management unit may be an SGSN.

The method may further include:
indicating in the flag, by the mobile management unit, that an output list is to be sorted according to a network topology; and returning, by the DNS server, the local access gateway based on the network topology in the output list; and selecting, by the mobile management unit, one local access gateway from a returned local access gateway list, wherein the output list comprises at least one of the base station identity, the local access identifier, the CSG identifier, the location identifier, and the tracking area/routing area identity.

A method for implementing local access includes:

when a local connection is to be established, constructing a domain name and inquiring a local access gateway from a Domain Name System (DNS) server, by the mobile management unit, according to a used Access Point Name (APN);

returning, by the DNS server, gateway information to the mobile management unit, wherein the gateway information comprises at least one of: information regarding to whether the access gateway supports local access, Closed Subscriber Group (CSG) information in an access gateway coverage, a tracking area/routing area identity in the access gateway coverage, and a location identifier in the access gateway coverage;

selecting, by the mobile management unit, one local access gateway based on the gateway information, to establish the local connection.

Establishing the local connection may include:

determining, by the mobile management unit, that the local connection can be established for a user terminal, on condition that a base station to which the user terminal initiates local access has a local access capability and a subscription permits the local access of the user terminal.

The local access may include a local access initiated during an attach procedure, or a Packet Data Network (PDN) connectivity establishment procedure, or a Packet Data Protocol (PDP) context activation procedure.

When the user terminal initiates the local access in an attach request, the method for implementing local access may be applicable to LTE access or UTRAN/GERAN access;

for the LTE access, the base station to which the user terminal initiates the local access may be an evolved Home NodeB (HeNB) or an evolved NodeB (eNB), and the mobile management unit may be a Mobility Management Entity (MME);

for the UTRAN/GERAN access, the base station to which the user terminal initiates the local access may be a Home NodeB (HNB) or a Radio Network Controller (RNC), and the mobile management unit may be a Serving GPRS Support Node (SGSN);

when the user terminal initiates the local access during the PDN connectivity establishment procedure, the method for implementing local access may be applicable to LTE access, the base station to which the user terminal initiates the local access may be an HeNB or an eNB, and the mobile management unit may be an MME;

when the user terminal initiates the local access during the PDP context activation procedure, the method for implementing local access may be applicable to UTRAN/GERAN access, the base station to which the user terminal initiates the local access may be an HNB or an RNC, and the mobile management unit may be an SGSN.

A system for implementing local access includes a user terminal, a mobile management unit, a local access gateway and a Domain Name System (DNS) server, wherein the mobile management unit is configured to construct a domain name and inquire local access gateway information from a Domain Name System (DNS) server, according to a used Access Point Name (APN) and at least one of a base station identity, a local access identifier, a Closed Subscriber Group (CSG), a location identifier, and a tracking area/routing area identity, when a local connection is to be established; and configured to select one local access gateway based on the local access gateway information returned by the DNS server, to establish the local connection;

the DNS server is configured to return the local access gateway information to the mobile management unit in response to the inquiry of the mobile management unit;

the user terminal is configured to initiate the local access to the mobile management unit and implement the local access through the local access gateway obtained.

The constructing the domain name and inquiring the local access gateway information from the DNS server by the mobile management unit may include the following steps performed by the mobile management unit:

constructing a Fully Qualified Domain Name (FQDN) according to the APN and at least one of the base station identity, the local access identifier, the CSG identifier, the location identifier, and the tracking area/routing area identity; and using the constructed FQDN as an input parameter for DNS inquiry, such that the DNS server returns the local access gateway based on a constructional request to the mobile management unit; or, constructing the FQDN according to the APN; and indicating in a flag that at least one of the base station identity, the local access identifier, the CSG identifier, location information, and the tracking area/routing area identity is to be selected, such that the DNS server returns the local access gateway based on a request to the mobile management unit.

The mobile management unit may be further configured to:

indicate in the flag that an output list is to be sorted according to a network topology, so that the DNS server returns the local access gateway based on the network topology in the output list; and select one local access gateway from a returned local access gateway list, wherein the output list includes at least one of the base station identity, the local access identifier, the CSG identifier, the location identifier, and the tracking area/routing area identity.

When the user terminal initiates the local access in an attach request, the system may be applicable to LTE access or UTRAN/GERAN access;

for the LTE access, the base station to which the user terminal initiates the local access may be an evolved Home NodeB (HeNB) or an evolved NodeB (eNB), and the mobile management unit may be a Mobility Management Entity (MME);

for the UTRAN/GERAN access, the base station to which the user terminal initiates the local access may be a Home NodeB (HNB) or a radio Network Controller (RNC), and the mobile management unit may be a Serving GPRS Support Node (SGSN);

when the user terminal initiates the local access during the PDN connectivity establishment procedure, the system may be applicable to LTE access, the base station to which the user terminal initiates the local access may be an HeNB or an eNB, and the mobile management unit may be an MME;

when the user terminal initiates the local access during the PDP context activation procedure, the system may be applicable to the UTRAN/GERAN access, the base station to which the user terminal initiates the local access may be an HNB or an RNC, and the mobile management unit may be an SGSN.

A system for implementing local access includes a user terminal, a mobile management unit, a local access gateway and a Domain Name System (DNS) server, wherein the mobile management unit is configured to construct a domain name according to a used Access Point Name (APN)

and inquire a local access gateway from a Domain Name System (DNS) server, when a local connection is to be established; and to select one local access gateway based on gateway information returned by the DNS server, to establish the local connection;

the DNS server is configured to return the gateway information to the mobile management unit in response to the inquiry of the mobile management unit, wherein the gateway information comprises at least one of: information regarding to whether the access gateway supports local access, Closed Subscriber Group (CSG) information in an access gateway coverage, a tracking area/routing area identity in the access gateway coverage, and a location identifier in the access gateway coverage;

the user terminal is configured to initiate the local access to the mobile management unit and implement the local access through the local access gateway obtained.

When the user terminal initiates the local access in an attach request, the system may be applicable to LTE access or UTRAN/GERAN access;

for the LTE access, the base station to which the user terminal initiates the local access may be an evolved Home NodeB (HeNB) or an evolved NodeB (eNB), and the mobile management unit may be a Mobility Management Entity (MME);

for the UTRAN/GERAN access, the base station to which the user terminal initiates the local access may be a Home NodeB (HNB) or a radio network controller (RNC), and the mobile management unit may be a Serving GPRS Support Node (SGSN);

when the user terminal initiates the local access during the PDN connectivity establishment procedure, the system may be applicable to LTE access, the base station to which the user terminal initiates the local access may be an HeNB or an eNB, and the mobile management unit may be an MME;

when the user terminal initiates the local access during the PDP context activation procedure, the system may be applicable to UTRAN/GERAN access, the base station to which the user terminal initiates the local access may be an HNB or an RNC, and the mobile management unit may be an SGSN.

It can be seen from the technical solution of the disclosure that local access is initiated at the user terminal, after determining that the local connection can be established for the user terminal, the mobile management unit inquires information of the local access gateway through the DNS server, and provides a specific implementation solution for inquiring local access gateway, therefore, it is able to select a core network gateway or a local access gateway according to a respective scenario, thereby implementing local access function realized by the user terminal through the local access gateway properly and effectively.

DETAILED DESCRIPTION

Figure 8:
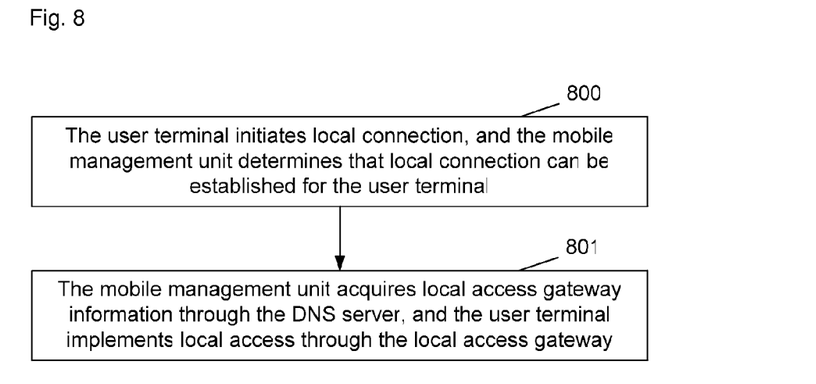
FIG. 8 shows a flow chart of a method for obtaining local access gateway according to the disclosure.

FIG. 8 shows a flow chart of a method for obtaining local access gateway according to the disclosure, as shown in FIG. 8, the method includes:

Step 800: the user terminal initiates a local access, and the mobile management unit determines that a local connection can be established for the user terminal.

In this step, the user terminal may initiate the local access during an attach procedure, or a Packet Data Network (PDN) connectivity establishment procedure, or a Packet Data Protocol (PDP) context activation procedure.

The method that the mobile management unit determines whether a local connection can be established for the user terminal can be as follows: the mobile management unit determines that the local connection can be established for the user terminal, on condition that a base station has a local access capability and a subscription permits the local access of the user terminal; otherwise, the mobile management unit determines that the local connection could not be established for the user terminal.

Step 801: the mobile management unit obtains local access gateway information through the Domain Name System (DNS) server, and the user terminal implements the local access through the local access gateway.

In this step, the method that the mobile management unit obtains the local access gateway information through the DNS server is implemented in two ways.

The first way: the mobile management unit constructs a fully Qualified Domain Name (FQDN) according to the used Access Point Name (APN) and at least one of the base station identity, the local access identifier, the Closed Subscriber Group (CSG), the location identifier, and the tracking area/routing area identity (It should be noted that it is called tracing area identity for the EUTRAN access and routing area identity for the UTRAN/GERAN access), and uses the constructed FQDN as an input parameter for DNS inquiry, such that the DNS server returns the local access gateway information based on the above request (i.e., constructional request) to the mobile management unit. Or, the mobile management unit constructs the FQDN according to the APN, indicates in a flag that at least one of the base station identity, the local access identifier, the CSG identifier, the location information, and the tracking area/routing area identity is to be selected, such that the DNS server returns the local access gateway information based on the above request to the mobile management unit.

Further, the mobile management unit may indicate in the flag that an output list (namely, the gateway list) is to be sorted according to a network topology, the DNS server returns the local access gateway list based on the network topology, the output list includes at least one of the base station identity, the local access identifier, the CSG identifier, the location identifier, and the tracking area/routing area identity, and the mobile management unit selects one local access gateway from the returned local access gateway list.

When the user terminal initiates a local access in an attach request, the method for implementing local access is applicable to LTE access or UTRAN/GERAN access; for the LTE access, the base station to which the user terminal initiates the local access is an evolved Home NodeB (HeNB) or an evolved NodeB (eNB), and the mobile management unit is a mobility management entity (MME); for the UTRAN/GERAN access, the base station to which the user terminal initiates the local access is a Home NodeB (HNB) or a Radio Network Controller (RNC), and the mobile management unit is a Serving GPRS Support Node (SGSN);

when the user terminal initiates the local access during the PDN connectivity establishment procedure, the method for implementing local access is applicable to LTE access, the base station to which the user terminal initiates the local access is an HeNB or aneNB, and the mobile management unit is an MME;

when the user terminal initiates the local access during the PDP context activation procedure, the method for implementing local access is applicable to UTRAN/GERAN access, the base station to which the user terminal initiates the local access is an HNB or anRNC, and the mobile management unit is an SGSN.

The second way: the mobile management unit may construct the FQDN according to the APN. When the DNS server returns the access gateway list, the access gateway list includes at least one of the following: information regarding to whether the access gateway supports local access, CSG information in an access gateway coverage, a tracking area/routing area identity in the access gateway coverage, and a location identifier in the access gateway coverage. The mobile management unit selects one local access gateway based on the location information and capacity of the gateway, to establish the local connection.

In this step, the implementation of local access through the obtained local access gateway belongs to common technical means for those skilled in the art, which will not be described here in details.

It should be noted that, in the disclosure, the method for establishing local connection may include: the mobile management unit determines that the local connection can be established for a user terminal, on condition that a base station to which the user terminal initiates local access has a local access capability and a subscription permits the local access of the user terminal.

In the disclosure, the local access means a local access initiated during an attach procedure, or a Packet Data Network (PDN) connectivity establishment procedure, or a Packet Data Protocol (PDP) context activation procedure.

When the user terminal initiates a local access in an attach request, the second method is applicable to LTE access or UTRAN/GERAN access; for the LTE access, the base station to which the user terminal initiates the local access is an evolved Home NodeB (HeNB) or an evolved NodeB (eNB), and the mobile management unit is a Mobility Management Entity (MME); for the UTRAN/GERAN access, the base station to which the user terminal initiates the local access is Home NodeB (HNB) or a Radio Network Controller (RNC), and the mobile management unit is a Serving GPRS Support Node (SGSN);

when the user terminal initiates the local access during the PDN connectivity establishment procedure, the second method for implementing local access is applicable to LTE access, the base station to which the user terminal initiates the local access is an HeNB or an eNB, and the mobile management unit is an MME;

when the user terminal initiates the local access during the PDP context activation procedure, the second method for implementing local access is applicable to UTRAN/GERAN access, the base station to which the user terminal initiates the local access is an HNB or an RNC, and the mobile management unit is an SGSN.

It should be noted that, the method of the disclosure is not limited to the type of the base station, which can be a Home (e)NodeB or a common base station. Meanwhile, the method of the disclosure is also applicable to a Home (e)NodeB system having a Home (e)NodeB gateway, in this case, all messages to be delivered between the Home (e)NodeB and the mobile management unit should be forwarded by the Home (e)NodeB gateway.

With respect to the method in the disclosure, a system for implementing local access is further provided. The system includes a user terminal, a mobile management unit, a local access gateway and a DNS server; wherein the mobile management unit is configured to construct a domain name and inquire local access gateway information from the DNS server, according to the used Access Point Name (APN) and at least one of the base station identity, the local access identifier, the CSG identifier, the location identifier, and the tracking area/routing area identity, when the local connection is to be established; and configured to select one local access gateway based on the local access gateway information returned by the DNS server, so as to establish the local connection;

the DNS server is configured to return the local access gateway information to the mobile management unit in response to the inquiry of the mobile management unit;

the user terminal is configured to initiate the local access to the mobile management unit and implement the local access through the local access gateway obtained.

The constructing the domain name and inquiring the local access gateway information from the DNS server by the mobile management unit includes the following steps:

the mobile management unit constructs a Fully Qualified Domain Name (FQDN) according to the APN and at least one of the base station identity, the local access identifier, the CSG identifier, the location identifier, and the tracking area/routing area identity, and uses the constructed FQDN as an input parameter for DNS inquiry, such that the DNS server returns the local access gateway based on a constructional request to the mobile management unit;

or, the mobile management unit constructs a FQDN according to the APN, indicates in a flag that at least one of the base station identity, the local access identifier, the CSG identifier, location information, and the tracking area/routing area identity is to be selected, such that the DNS server returns the local access gateway based on a request to the mobile management unit.

The mobile management unit is further configured to indicate in the input-flag that an output list is to be sorted according to a network topology, so that the DNS server returns the local access gateway based on the network topology in the output list; and the mobile management unit is further configured to select one local access gateway from the returned local access gateway list, wherein the output list includes at least one of the base station identity, the local access identifier, the CSG identifier, the location identifier, and the tracking area/routing area identity.

When the user terminal initiates a local access in an attach request, the system is applicable to LTE access or UTRAN/GERAN access; for the LTE access, the base station to which the user terminal initiates the local access is an evolved Home NodeB (HeNB) or an evolved NodeB (eNB), and the mobile management unit is a Mobility Management Entity (MME); for the UTRAN/GERAN access, the base station to which the user terminal initiates the local access is a Home NodeB (HNB) or a Radio Network Controller (RNC), and the mobile management unit is a Serving GPRS Support Node (SGSN);

when the user terminal initiates the local access during the PDN connectivity establishment procedure, the system is applicable to the LTE access, the base station to which the user terminal initiates the local access is an HeNB or an eNB, and the mobile management unit is an MME;

when the user terminal initiates the local access during the PDP context activation procedure, the system is applicable to the UTRAN/GERAN access, the base station to which the user terminal initiates the local access is an HNB or an RNC, and the mobile management unit is an SGSN.

With respect to the method of the disclosure, a system for implementing local access is further provided. The system includes a user terminal, a mobile management unit, a local access gateway and a DNS server; wherein the mobile management unit is configured to construct a domain name according to the used Access Point Name (APN) and inquire local access gateway information from the DNS server, when the local connection is to be established; and to select a local access gateway based on gateway information returned by the DNS server, so as to establish the local connection;

the DNS server is configured to return the gateway information to the mobile management unit in response to the inquiry of the mobile management unit, wherein the gateway information includes at least one of: information regarding to whether the access gateway supports local access, CSG information in an access gateway coverage, a tracking area/routing area identity in the access gateway coverage, and a location identifier in the access gateway coverage;

the user terminal is configured to initiate the local access to the mobile management unit and implement the local access through the local access gateway obtained.

When the user terminal initiates the local access in an attach request, the system is applicable to LTE access or UTRAN/GERAN access; for the LTE access, the base station to which the user terminal initiates the local access is an evolved Home NodeB (HeNB) or an evolved NodeB (eNB), and the mobile management unit is a Mobility Management Entity (MME); for the UTRAN/GERAN access, the base station to which the user terminal initiates the local access is a Home NodeB (HNB) or a Radio Network Controller (RNC), and the mobile management unit is a Serving GPRS Support Node (SGSN);

when the user terminal initiates the local access during the PDN connectivity establishment procedure, the system is applicable to LTE access, the base station to which the user terminal initiates the local access is an HeNB or an eNB, and the mobile management unit is an MME;

when the user terminal initiates the local access during the PDP context activation procedure, the system is applicable to the UTRAN/GERAN access, the base station to which the user terminal initiates the local access is an HNB or an RNC, and the mobile management unit is an SGSN.

It should be noted that, in the disclosure, the inquiry procedure in which the mobile management unit inquiries the required parameters of the DNS server may be one time of inquiry or multiple times of inquiries. In case of multiple times of inquiries, the mobile management unit may select a proper gateway to establish the local connection by matching the results in multiple times of inquiries.

The method in the disclosure will be described below in details in conjunction with embodiments.

Figure 9:
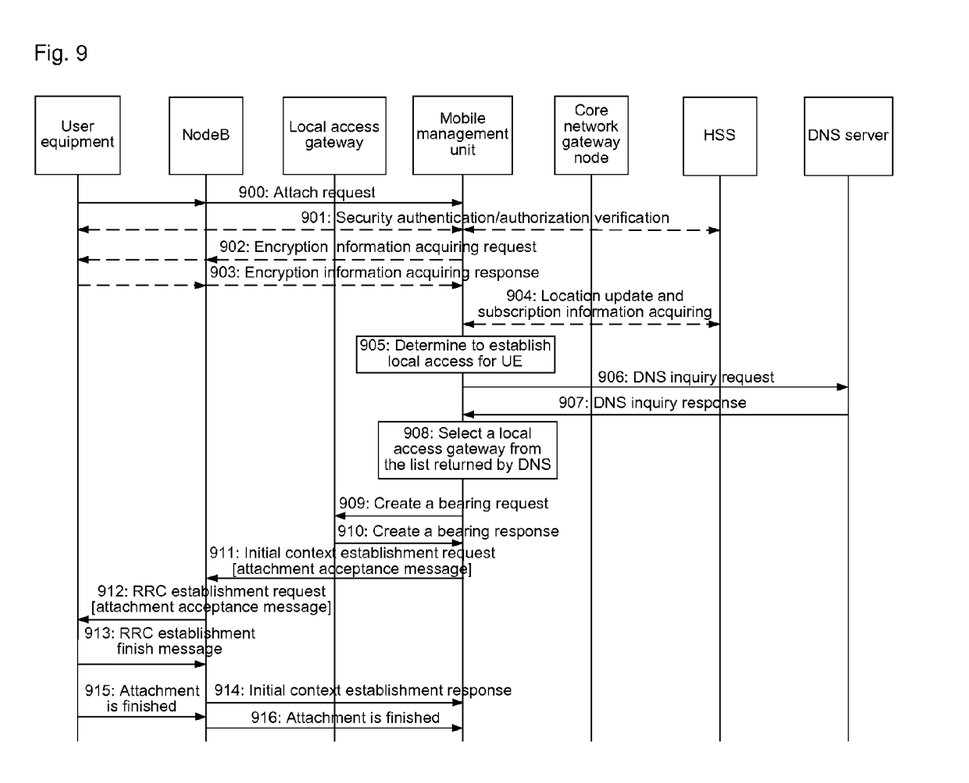
FIG. 9 shows a flow chart of the first embodiment for obtaining local access gateway according to the disclosure.

FIG. 9 shows the flow chart of the first embodiment for obtaining local access gateway according to the disclosure, the first embodiment is applicable to the LTE access or UTRAN/GERAN access, for the LTE access, the base station is a HeNB or an eNB and the mobile management unit is a Mobility Management Entity (MME). For the UTRAN/GERAN access, the base station is an HNB or an RNC and the mobile management unit is a Serving GPRS Support Node (SGSN). While the core network gateway is a GGSN/SGW/PGW located in the core network, the network element will not be limited too much herein as it is irrelevant with the disclosure. In the first embodiment, description will be given by taking the base station as an example, and the effect on Home (e)NodeB is the same. As shown in FIG. 9, the method includes:

Step 900: when the computer is started, the user initiates an attach procedure to register to the core network, that is, the UE sends an attach request message to the mobile management unit through the base station.

In this step, the non-access stratum message, namely, the attach request message, is encapsulated in the initial UE message at the S1 interface by the base station and is then sent to the mobile management unit, and the base station also sends information regarding to whether the base station has capacity of supporting local connection or not and the attach request containing the APN to the core network.

Step 901: after the mobile management unit receives the attach request message, if it is found that there is no context information of the UE in the network, or that the attach request message has no integrity protection, or that the integrity protection of the attach request message fails, the mobile management unit performs authentication of the user terminal.

Steps 902-903: when the information in which the UE requests to establish local connection in the attach request or Protocol Configuration Option (PCO) and/or APN provided by the UE is ciphered, then, the mobile management unit requests PCO and/or APN information from the UE through the base station. For example, ciphered options request and ciphered options response shown in FIG. 9.

Step 904: if there is no subscription information of the UE in the mobile management unit, the mobile management unit sends a location update request message to an HSS, to request the subscription information of the UE.

Step 905: the mobile management unit determines whether the local connection can be established for the user terminal, if so, execute step 906, otherwise it establishes a core network bearing for the UE, this procedure will not be described again as it belongs to a technology well known for those skilled in the art.

In this step, the determination method is that if the information carried in the attach request message regarding to whether the base station supports local access is displayed to be YES, and a subscription permits the local IP access of the user terminal, it is determined that the local connection can be established for the user terminal. In the embodiment, it is assumed that the mobile management unit determines that it is needed to establish the local connection for the UE.

Steps 906-907: the mobile management unit inquires the local access gateway IP address to be connected from the DNS server.

In this step, the first implementation way is as follows: the MME constructs a FQDN according to an APN, and the base station identity, and/or the local access identifier, and/or the CSG identifier, and/or the location identifier, and/or the tracking area identity, and uses the constructed FQDN as an input parameter for DNS inquiry, such that the DNS server returns the local access gateway based on a constructional request to the MME. Or, the MME constructs the FQDN according to the APN, indicates in a flag that the base station identity, and/or the local access identifier, and/or the CSG identifier, and/or the location information is to be selected, such that the DNS server returns the local access gateway based on the above request to MME.

For example, the format through which the MME constructs the FQDN according to the APN and the base station identity may be as follows, and for other implementation ways, code at "enbid" can be replaced with other types of identifiers:

internet.apn.epc.enbid.mnc015.mcc234.3gppnetwork.org

For example, the MME constructs FQDN according to the APN and uses the base station identity as the flag:

internet.apn.epc.mnc015.mcc234.3gppnetwork.org endid (it may be a specific code)

Further, the MME may indicate in the flag that an output list, namely the gateway list, is to be sorted according to a network topology, the output list includes the base station identity, and/or the local access identifier, and/or the CSG identifier, and/or the location identifier, and/or the tracking area identity, in this way, the DNS server returns the local access gateway list based on the network topology in the output list. Herein, sorting the output list, namely the gateway list, will not be described in details as it belongs to a technology well know for those skilled in the art.

The second way is as follows: the MME constructs a FQDN according to an APN. The DNS server identifies the information regarding to whether the access gateway supports local access, and/or the CSG information in an access gateway coverage, and/or the tracking area/routing area identity in the access gateway coverage, and/or location identifier in the access gateway coverage when the DNS server returns the access gateway list.

The above method describes the required parameters of the inquiry; however, the inquiry procedure may be one time of inquiry or multiple times of inquiries. In case of multiple times of inquiries, the mobile management unit may select a proper gateway to establish the local connection by matching results of multiple times of inquiries.

Step 908: the local access gateway is selected from the list returned by the DNS server.

If the first way is adopted in step 906 to step 907, then in this step, the mobile management unit selects one local access gateway from the returned local access gateway list; and if the second way is adopted, then the mobile management unit selects one local access gateway according to the location information and capacity of the gateway.

Steps 909-910: the mobile management unit sends a create session request to the local access gateway, wherein the create session request carries the identifier information of the UE and TEID of control plane and other information.

Step 911: the mobile management unit sends an initial context setup request to the base station, in which the attach accept message sent to the UE is included.

Steps 912-913: RRC connection is established between the base station and the UE. During this procedure, the base station sends the attach accept message sent from the mobile management unit to the UE through the RRC establishment request.

Step 914: the base station receives an initial context setup request and returns an initial context setup response to the mobile management unit.

Steps 915-916: the UE returns an attach complete message to the mobile management unit through the base station.

Figure 10:
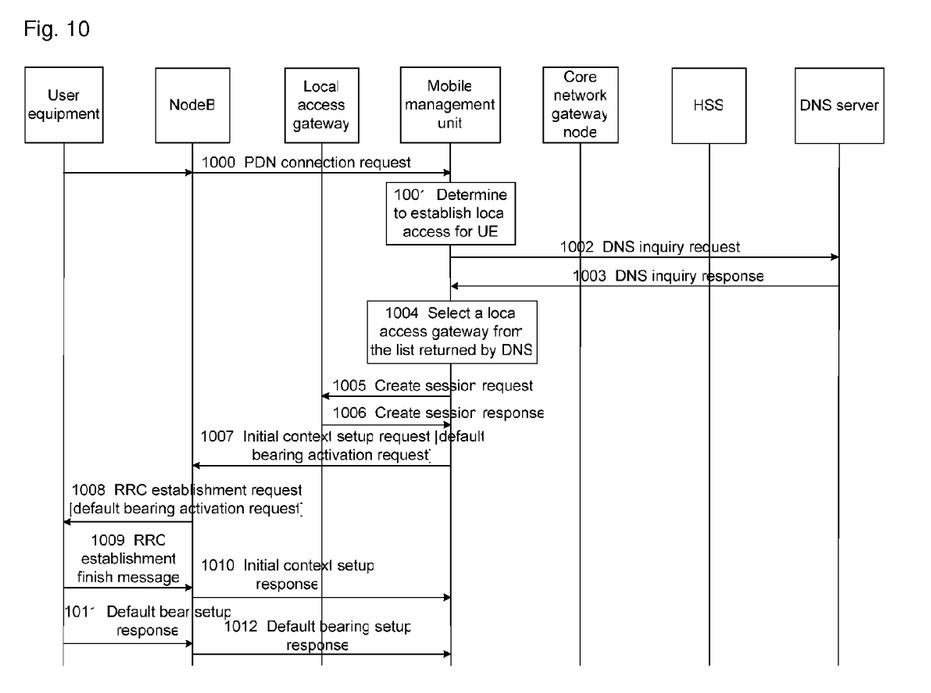
FIG. 10 shows a flow chart of the second embodiment for obtaining local access gateway according to the disclosure.

FIG. 10 shows the flow chart of the second embodiment for obtaining local access gateway according to the disclosure, the second embodiment is applicable to LTE access, wherein the base station is an HeNB or an eNB and the mobile management unit is a MME. While the core network gateway is SGW/PGW located in the core network, the network element will not be limited too much herein as it is irrelevant with the disclosure. In the second embodiment, description will be given by taking the base station as an example; and the effect on Home NodeB is the same. As shown in FIG. 10, the method includes:

Step 1000: the user terminal initiates a PDN connectivity request to the mobile management unit through the base station, wherein the PDN connectivity request carries the APN information required by the UE.

In this step, the non-access stratum message, namely, the PDN connectivity request, is encapsulated in the initial UE message at the S1 interface by the base station and is then sent to the mobile management unit, and the base station also sends the information regarding to whether the base station has the capacity of supporting local connection or not and the attach request containing the APN to the core network.

Step 1001: the mobile management unit receives the PDN connectivity request and determines whether to establish a local connection for the UE. If it is needed to establish a local connection for the UE, execute step 903. In the embodiment, it is assumed that the mobile management unit determines that that it is needed to establish a local connection for the UE.

Steps 1002-1003: the mobile management unit inquires IP address of the local access gateway to be connected from the DNS server.

In this step, the first implementation way is as follows: the MME constructs a FQDN according to an APN, and the base station identity, and/or the local access identifier, and/or the CSG identifier, and/or the location identifier, and/or the tracking area identity, and uses the constructed FQDN as an input parameter for DNS inquiry, such that the DNS server returns the local access gateway based on a request to the MME. Or, the MME constructs the FQDN according to the APN, indicates in a flag that the base station identity, and/or the local access identifier, and/or the CSG identifier, and/or the location information is to be selected, such that the DNS server returns the local access gateway based on the above request to the MME.

Further, the MME may indicate in the flag that an output list, namely the gateway list, is to be sorted, according to a network topology, the output list includes the base station identity, and/or the local access identifier, and/or the CSG identifier, and/or the location identifier, and/or the tracking area identity, in this way, the DNS server returns the local access gateway based on the network topology request in the output list.

The second way is as follows: the MME constructs a FQDN through an APN. The DNS server identifies the information regarding to whether the access gateway supports local access, and/or the CSG information in an access gateway coverage, and/or the tracking area/routing area identity in the access gateway coverage, and/or the location identifier in the access gateway coverage when the DNS server returns the access gateway list.

The above method describes the required parameters of the inquiry; however, the inquiry procedure may be one time of inquiry or multiple times of inquiries. In case of multiple times of inquiries, the mobile management unit may select a proper gateway to establish the local connection by matching results of multiple times of inquiries.

Step 1004: the local access gateway is selected from the list returned by the DNS server.

If the first way is adopted in step 1002 to step 1003, then in this step, the mobile management unit selects one local access gateway from the returned local access gateway list; and if the second way is adopted, then the mobile management unit selects one local access gateway according to the location information and capacity of the gateway.

Steps 1005-1006: the mobile management unit sends a create session request to the local access gateway, wherein the create session request carries the identifier information of the UE and TEID of control plane and other information.

Step 1007: the mobile management unit sends an initial context setup request to the base station, wherein the initial context setup request includes a default bear activation request sent to the UE.

Steps 1008-1009: RRC connection is established between the base station and the UE. During this procedure, the base station sends the default bear activation request to the UE through the RRC establishment request.

Step 1010: the base station returns an initial context setup response to the mobile management unit.

Steps 1011-1012: the UE returns the default bear activation response to the mobile management unit.

Figure 11:
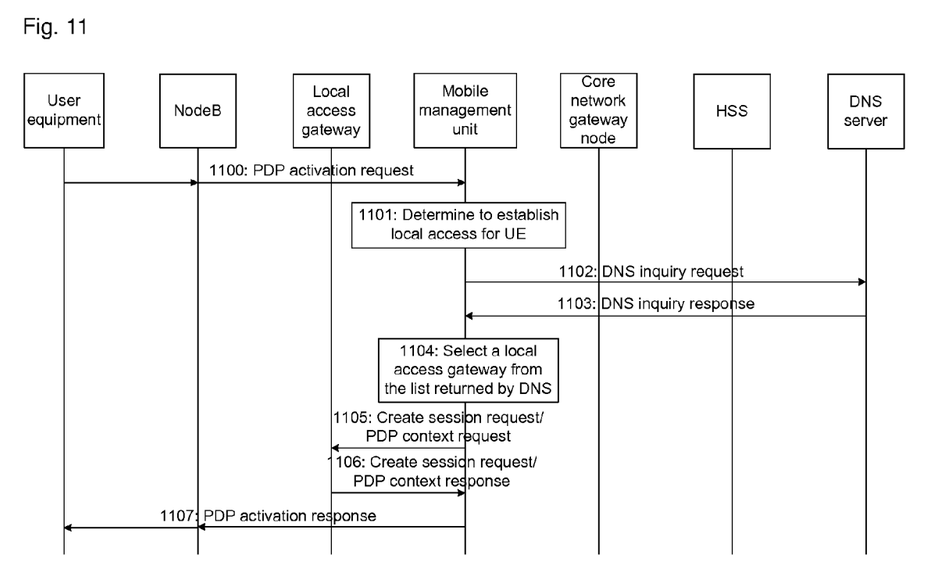
FIG. 11 shows a flow chart of the third embodiment for obtaining local access gateway according to the disclosure.

FIG. 11 shows the flow chart of the third embodiment for obtaining the local access gateway according to the disclosure, the third embodiment is applicable to the UTRAN/GERAN access, wherein the base station is an HNB or an RNC and the mobile management unit is an SGSN. While the core network gateway is a GGSN/SGW/PGW located in the core network, the network element will not be limited too much herein as it is irrelevant with the disclosure. In the third embodiment, description will be given by taking the base station as an example, and the effect on Home NodeB is the same. The embodiment will be described by taking the procedure in which a UTRAN/GERAN user performs PDP context activation as an example; however, the procedure is also applicable to a procedure in which a UTRAN/GERAN user performs secondary-PDP context activation. As shown in FIG. 11, the method includes:

Step 1100: the user terminal initiates a PDP activation request, in which the APN connection information required by the UE is carried.

In this step, the non-access stratum message, namely, the PDP activation request, is transmitted to the mobile management unit through the base station, and the base station also sends the information regarding to whether the base station has the capacity of supporting the local connection or not and the attach request containing the APN to the core network.

Step 1101: the mobile management unit determines whether to establish a local connection for the UE. If it is needed to establish a local connection for the UE, execute step 1102. In the embodiment, it is assumed that the mobile management unit determines that that it is needed to establish a local connection for the UE.

Steps 1102-1103: the mobile management unit inquires IP address of the local access gateway to be connected from the DNS server.

In this step, the first implementation way is as follows: the SGSN constructs a FQDN according to an APN, and the base station identity, and/or the local access identifier, and/or the CSG identifier, and/or the location identifier, and/or the routing area identity, and uses the constructed FQDN as an input parameter for DNS inquiry, such that the DNS server returns the local access gateway based on the request to the SGSN. Or, the MME constructs the FQDN according to the APN, indicates in a flag that the base station identity, and/or the local access identifier, and/or the CSG identifier, and/or the location information is to be selected, such that the DNS server returns the local access gateway based on the above request to MME.

Further, the SGSN may indicate in the flag that an output list, namely the gateway list, is to be sorted according to a network topology, the output list includes the base station identity, and/or the local access identifier, and/or the CSG identifier, and/or The second way is as follows: the SGSN constructs a FQDN according to an APN. The DNS server identifies the information regarding to whether the access gateway supports local access, and/or the CSG information in an access gateway coverage, and/or the routing area/routing area identifies in the access gateway coverage, and/or location identifier in the access gateway coverage when the DNS server returns the access gateway list.

The above method describes the required parameters of the inquiry; however, the inquiry procedure may be one time of inquiry or multiple times of inquiries. In case of multiple times of inquiries, the mobile management unit may select a proper gateway to establish the local connection by matching results of multiple times of inquiries.

Step 1104: the local access gateway is selected from the list returned by the DNS server.

If the first way is adopted in step 1102 to step 1103, then in this step, the mobile management unit selects one local access gateway from the returned local access gateway list; and if the second way is adopted, then the mobile management unit selects one local access gateway according to the location information and capacity of the gateway.

Steps 1105-1106: the mobile management unit sends a create session request/PDP context request to the local access gateway, wherein the create session request/PDP context request carries the identifier information of the UE and TEID of control plane and other information.

Step 1107: the mobile management unit returns a PDP activation response to the UE, and the PDP activation response is sent to the UE through the Home NodeB.

Above contents only describe preferable embodiments of the disclosure and are not intended to limit the protection scope of the disclosure. Any modification, equivalent replacement and improvement within the spirit and principle of the disclosure should be included within the protection scope of the disclosure.

The invention claimed is:

1. A method for implementing local access, comprising:
when a local connection is to be established,
constructing, by a mobile management unit, Fully Qualified Domain Name (FQDN) according to a used Access Point Name (APN) and at least one of a base station identity, a local access identifier, a Closed Subscriber Group (CSG) identifier, a location identifier, and a tracking area/routing area identity; inquiring, by the mobile management unit, local access gateway information from a Domain Name System (DNS) server by using the constructed FQDN as an input parameter; returning, by the DNS server, the local access gateway information to the mobile management unit; or,
constructing, by a mobile management unit, FQDN according to a used APN; indicating, by the mobile management unit, in a first flag that at least one of a base station identity, a local access identifier, a CSG identifier, a location identifier, and a tracking area/routing area identity is to be included, wherein the first flag carries at least one of the base station identity, the local access identifier, the CSG identifier, location information, and the tracking area/routing area identity; inquiring, by the mobile management unit, local access gateway information from a DNS server by using the constructed FQDN and the first flag as an input parameter; returning, by the DNS server, the gateway information to the mobile management unit; or, constructing, by a mobile management unit, FQDN according to a used APN; inquiring, by the mobile management unit, local access gateway information from a DNS server by using the constructed FQDN as an input parameter; returning, by the DNS server, the gateway information to the mobile management unit, wherein the gateway information comprises at least one of: information regarding to whether the access gateway supports local access, CSG information in an access gateway coverage, a tracking area/routing area identity in the access gateway coverage, and a location identifier in the access gateway coverage; and selecting, by the mobile management unit, one local access gateway based on the gateway information, to establish the local connection;

wherein the DNS server returns the local access gateway information, based on a constructional request containing the constructed FQDN and the input parameter, to the mobile management unit.

2. The method according to claim 1, wherein establishing the local connection comprises:
   determining, by the mobile management unit, that the local connection can be established for a user terminal, on condition that a base station to which the user terminal initiates local access has a local access capability and a subscription permits the local access of the user terminal.

3. The method according to claim 1, wherein the local access comprises a local access initiated during an attach procedure, or a Packet Data Network (PDN) connectivity establishment procedure, or a Packet Data Protocol (PDP) context activation procedure.

4. The method according to claim 3, wherein when the user terminal initiates the local access in an attach procedure, the method for implementing local access is applicable to LTE access or UTRAN/GERAN access;
   for the LTE access, the base station to which the user terminal initiates the local access is an evolved Home NodeB (HeNB) or an evolved NodeB (eNB), and the mobile management unit is a Mobility Management Entity (MME);
   for the UTRAN/GERAN access, the base station to which the user terminal initiates the local access is a Home NodeB (HNB) or a Radio Network Controller (RNC), and the mobile management unit is a Serving GPRS Support Node (SGSN);
   when the user terminal initiates the local access during the PDN connectivity establishment procedure, the method for implementing local access is applicable to Long Term Evolution (LTE) access, the base station to which the user terminal initiates the local access is an HeNB or an eNB, and the mobile management unit is an MME;
   when the user terminal initiates the local access during the PDP context activation procedure, the method for implementing local access is applicable to Universal Terrestrial Radio Access Network (UTRAN)/GSM EDGE Radio Access Network (GERAN) access, the base station to which the user terminal initiates the local access is an HNB or an RNC, and the mobile management unit is an SGSN.

5. The method according to claim 1, wherein the method further comprises:
   indicating in a second flag, by the mobile management unit, that an output list is to be sorted according to a network topology; and returning, by the DNS server, the local access gateway based on the network topology in the output list; and
   selecting, by the mobile management unit, one local access gateway from a returned local access gateway list,
   wherein the output list comprises at least one of the base station identity, the local access identifier, the CSG identifier, the location identifier, and the tracking area/routing area identity.

6. A system for implementing local access, said system comprising a user terminal, a mobile management unit, a local access gateway and a Domain Name System (DNS) server, wherein
   the mobile management unit is configured to construct Fully Qualified Domain Name (FQDN) according to a used Access Point Name (APN) and at least one of a base station identity, a local access identifier, a Closed Subscriber Group (CSG) identifier, a location identifier, and a tracking area/routing area identity; or construct FQDN according to a used APN and indicate in a first flag that at least one of a base station identity, a local access identifier, a CSG identifier, a location identifier, and a tracking area/routing area identity is to be included, wherein the first flag carries at least one of the base station identity, the local access identifier, the CSG identifier, location information, and the tracking area/routing area identity; or construct FQDN according to a used APN, and configured to inquire local access gateway information from the DNS server by using the constructed FQDN or the constructed FQDN and the first flag as an input parameter; and select one local access gateway based on the local access gateway information returned by the DNS server;
   the DNS server is configured to return the local access gateway information to the mobile management unit in response to the inquiry from the mobile management unit, wherein if the inquiry from the mobile management does not contain one of a base station identity, a local access identifier, a Closed Subscriber Group (CSG) identifier, a location identifier, and a tracking area/routing area identity, the local access gateway information comprises at least one of: information regarding to whether the access gateway supports local access, Closed Subscriber Group (CSG) information in an access gateway coverage, a tracking area/routing area identity in the access gateway coverage, and a location identifier in the access gateway coverage;
   the user terminal is configured to initiate the local access to the mobile management unit and implement the local access through the local access gateway obtained;
   wherein the DNS server returns the local access gateway information, based on a constructional request containing the constructed FQDN and the input parameter, to the mobile management unit.

7. The system according to claim 6, wherein
   the mobile management unit is further configured to:
   indicate in a second flag that an output list is to be sorted according to a network topology, so that the DNS server returns the local access gateway based on the network topology in the output list; and
   select one local access gateway from a returned local access gateway list, wherein the output list includes at least one of the base station identity, the local access identifier, the CSG identifier, the location identifier, and the tracking area/routing area identity.

8. The system according to claim 6, wherein when the user terminal initiates the local access in an attach procedure, the system is applicable to LTE access or UTRAN/GERAN access;
- for the LTE access, the base station to which the user terminal initiates the local access is an evolved Home NodeB (HeNB) or an evolved NodeB (eNB), and the mobile management unit is a Mobility Management Entity (MME);
- for the UTRAN/GERAN access, the base station to which the user terminal initiates the local access is a Home NodeB (HNB) or a Radio Network Controller (RNC), and the mobile management unit is a Serving GPRS Support Node (SGSN);
- when the user terminal initiates the local access during the PDN connectivity establishment procedure, the system is applicable to LTE access, the base station to which the user terminal initiates the local access is an HeNB or an eNB, and the mobile management unit is an MME;
- when the user terminal initiates the local access during the PDP context activation procedure, the system is applicable to the UTRAN/GERAN access, the base station to which the user terminal initiates the local access is an HNB or an RNC, and the mobile management unit is an SGSN.

\* \* \* \* \*